Oct. 31, 1933.  E. R. SMITH  1,933,224
TOOL SLIDE ACTUATING MECHANISM
Filed Aug. 3, 1931
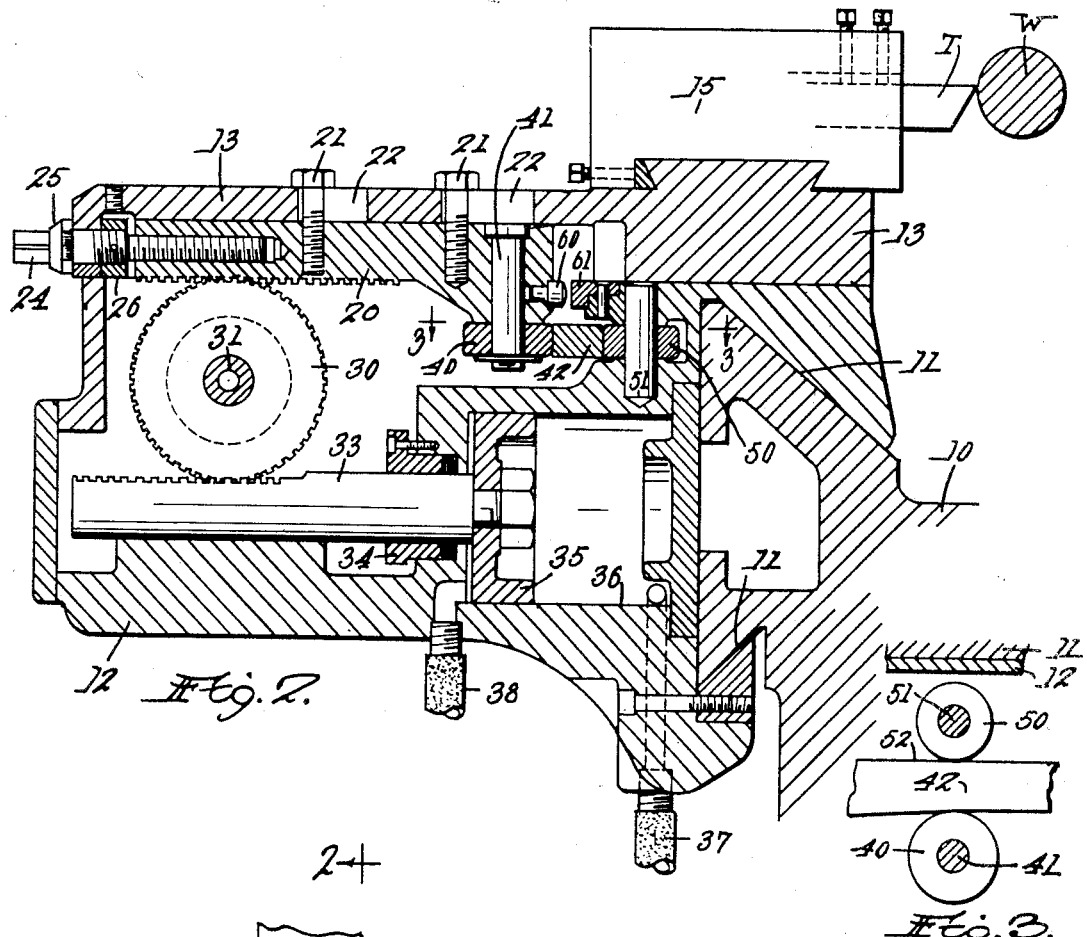
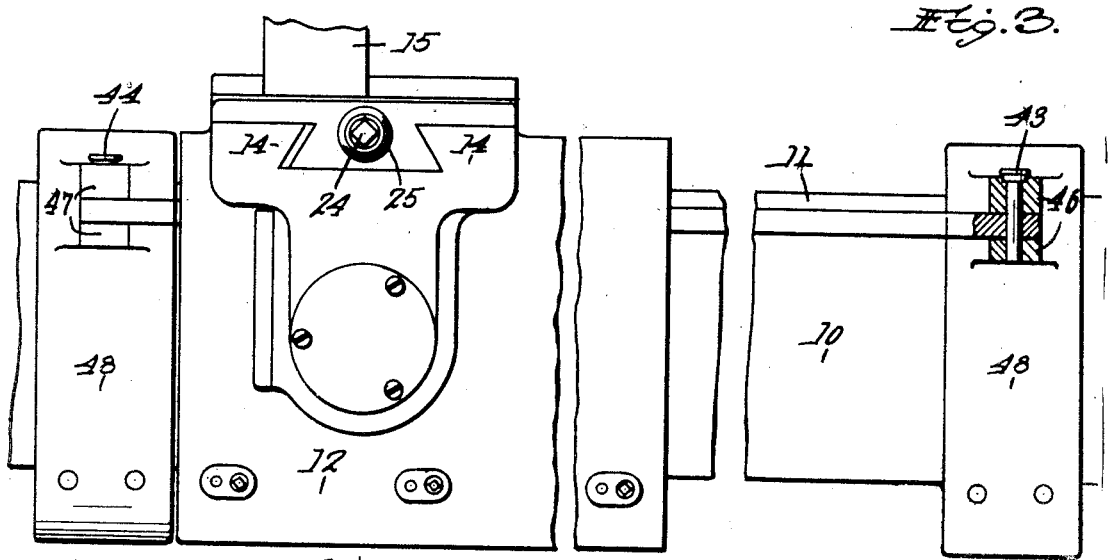
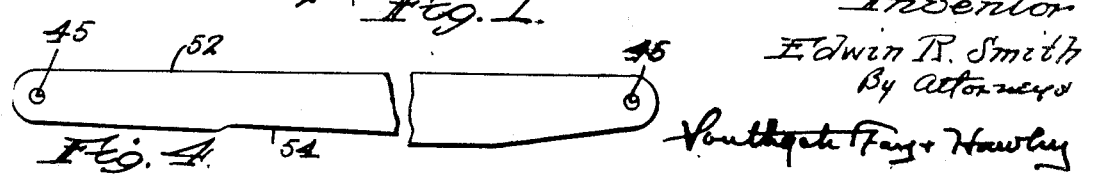
Inventor
Edwin R. Smith
By Attorneys Patented Oct. 31, 1933

1,933,224

UNITED STATES PATENT OFFICE 1,933,224

TOOL SLIDE ACTUATING MECHANISM

Edwin R. Smith, Seneca Falls, N. Y., assignor to Seneca Falls Machine Company, Seneca Falls, N. Y., a corporation of Massachusetts Application August 3, 1931. Serial No. 554,717

2 Claims. (Cl. 82—14)

This invention relates to mechanism for actuating a slide or carriage in a machine tool, such as the tool slide of a lathe.

It is the general object of my invention to provide hydraulic means for moving a slide toward and away from operative position, together with templet means for defining the operating position and for effecting changes in the operating position as the slide is moved lengthwise of the machine.

To the accomplishment of this object, I provide a hydraulic cylinder and piston for moving the slide in and out, and I positively limit the inward movement by engagement of a roll on the slide with a templet bar supported on the machine frame.

A further feature of my invention relates to the provision of means by which the slide may be moved out to separate the tool from the work at any desired point in its travel and by which it may be thereafter returned.

My invention further relates to arrangements and combinations of parts which will be hereinafter described and more particularly pointed out in the appended claims.

A preferred form of the invention is shown in the drawing, in which

Fig. 1 is a front elevation of parts of a lathe embodying my improvements;

Fig. 2 is a sectional end elevation, taken along the line 2—2 in Fig. 1;

Fig. 3 is a detail sectional plan view, taken along the line 3—3 in Fig. 2, and

Fig. 4 is a plan view of a templet bar.

Referring to the drawing, I have shown a portion of the frame or bed 10 of a lathe, provided with guideways 11 on which a tool carriage 12 is slidably mounted. Any usual actuating mechanism such as a lead screw may be provided to move the tool carriage 12 along the guideways 11.

A tool slide 13 is mounted in guideways 14 on the carriage 12 and is movable thereon transversely of the lathe. A tool holder 15 is adjustably secured on the slide 13 and supports a tool T in position to engage the work W.

A rack plate 20 is mounted below the tool slide 13 and is secured to the slide by binding screws 21, extending through slots 22. An adjusting screw 24 is rotatably mounted in the front end of the slide 13 but is held from relative axial movement by a flange 25 and nut 26.

The screw 24 is threaded into the front end of the rack plate 20 and the tool slide may be adjusted relative to the plate by loosening the binding screws 21 and turning the adjusting screw 24. The flange 25 may be graduated to serve as an index if desired.

A gear 30 is pivoted at 31 in the carriage 12 and engages the rack teeth on the under side of the rack plate 20. The gear 30 also engages rack teeth on the upper side of a plunger 33, slidable in a bearing 34 and having a piston 35 secured thereto. The piston 35 is mounted within a cylinder 36 having oil connections 37 and 38 at its opposite ends.

When oil is admitted through the pipe 37, the tool T is advanced toward the work and when oil is admitted through the pipe 38 the tool is withdrawn from the work. It will be understood that whenever one of these two pipes is connected to supply oil, the other pipe is connected to a suitable exhaust or return.

A roll 40 is mounted on a stud 41 secured in the rear end portion of the rack plate 20 and is positioned to engage the front edge of a templet bar 42, secured by pins 43 and 44 (Fig. 1) which extend through openings 45 in the ends of the templet bar. These pins are mounted in lugs or projections 46 and 47 on the front of brackets 48, adap'ed to be secured in axially adjusted position on the guideways 11 previously described.

A roll 50 is mounted on a stud 51 fixed in the tool carriage 12. The rear edge 52 of the templet bar 42 is made straight and is positioned parallel to the guideways 11, so that it is uniformly engaged and supported by the roll 50 as the carriage 12 is moved axially of the work.

The hydraulic mechanism described forces the tool slide yieldingly rearward and holds the roll 40 in firm engagement against the front edge 54 of the templet bar 42. This front edge may be of any desired contour to correspond to the shape of the piece of work to be produced and the tool slide will be positioned by the roll 40 as the roll follows the contoured edge 54 when the carriage is moved longitudinally. The roll is held in firm engagement with the bar in all longitudinal positions by the hyraulic pressure in the cylinder 36.

I have thus provided for easy and rapid movement of the tool toward and from the work and for accurae positioning of the tool during the working stroke, even when producing very irregular work. At any point in the travel of the tool carriage the tool may be withdrawn by simply reversing the connections to the cylinder 36. This is a matter of substantial importance, as it permits the tool to be moved away from the work for inspection or repair at any point in the travel of the tool carriage, or to clear an abrupt shoulder on the work.

When the lathe is to be used for the production of straight cylindrical work, the templet bar may be removed and a stop stud 60 (Fig. 2) may be caused to engage an abutment 61 fixed in the tool carriage 12, thus holding the tool in fixed relation to the work during longitudinal movement of the tool carriage. The adjustment of the tool toward and from the work will be accomplished by the adjusting screw 24 as previously explained.

I have thus produced a construction by which a wide variety of irregular work may be produced in a lathe by simply providing templet bars of the desired outline. These templet bars are easily and cheaply made, it being merely necessary to take a bar of the desired rectangular cross section, provide holes 45 for the pins 43 and 44, and work out the desired contour along the front edge of the bar, all of which operations may be quickly and easily performed.

While I have defined the actuating mechanism as "hydraulic", I intend this term to include fluid-operated mechanism broadly. I also intend the word "transversely" to cover movement of the tool and tool slide toward the work, whether by direct approach or by angular approach.

Having thus described my invention and the advantages thereof, I do not wish to be limited to the details herein disclosed, otherwise than as set forth in the claims, but what I claim is:—

1. In a machine tool, a frame, a tool carriage movable lengthwise on guideways of said frame, a tool slide movable transversely on said carriage, hydraulic mechanism including a cylinder and piston and connected to move said slide transversely, a contact member on said slide, a templet bar mounted in end brackets fixed to said frame, said bar being spaced from said frame and being engaged on one edge by said member and limiting movement of said slide toward the work by said hydraulic mechanism, and a second member on said carriage positioned between said bar and frame and engaging the rear opposite edge of said bar in substantial alignment with said first contact member, thereby effectively resisting the hydraulic pressure applied to said bar through said first-mentioned contact member.

2. In a machine tool, a frame, a tool support mounted on said frame, a tool slide movable on said support toward and from the work, a contact member associated with said tool slide, means to adjust said member lengthwise of said slide, means to secure said member in adjusted position on said slide, a contact element fixed on said tool support, hydraulic means effective to force said contact member into engagement with said fixed contact element and to withdraw said contact member from said contact element, and means to move said tool support lengthwise of said frame while said contact member is held against said contact element.

EDWIN R. SMITH.